US008026927B2

(12) United States Patent
Daly et al.

(10) Patent No.: US 8,026,927 B2
(45) Date of Patent: Sep. 27, 2011

(54) REDUCTION OF MURA EFFECTS

(75) Inventors: Scott J. Daly, Kalama, WA (US); Yasuo Ozawa, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 635 days.

(21) Appl. No.: 11/731,094

(22) Filed: Mar. 29, 2007

(65) Prior Publication Data

US 2008/0238934 A1 Oct. 2, 2008

(51) Int. Cl.

| | |
|---|---|
| ***G09G 5/00*** | (2006.01) |
| ***G09G 3/36*** | (2006.01) |
| ***G09G 5/02*** | (2006.01) |
| ***G06T 17/00*** | (2006.01) |
| ***H04N 7/18*** | (2006.01) |

(52) U.S. Cl. .......... 345/617; 345/88; 345/601; 345/428; 348/126

(58) Field of Classification Search ........... 345/418–689
See application file for complete search history.

(56) References Cited

U.S. PATENT DOCUMENTS

| | | | | |
|---|---|---|---|---|
| 5,917,935 | A | 6/1999 | Hawthorne et al. | |
| 6,154,561 | A | 11/2000 | Pratt et al. | |
| 2003/0214586 | A1* | 11/2003 | Lee et al. | 348/180 |
| 2004/0179028 | A1 | 9/2004 | Arai | |
| 2005/0007364 | A1 | 1/2005 | Oyama et al. | |
| 2005/0007392 | A1 | 1/2005 | Kasai et al. | |
| 2005/0099431 | A1* | 5/2005 | Herbert et al. | 345/601 |
| 2006/0034536 | A1* | 2/2006 | Ogren et al. | 382/254 |
| 2007/0091042 | A1* | 4/2007 | Chung et al. | 345/88 |

FOREIGN PATENT DOCUMENTS

| | | |
|---|---|---|
| EP | 1 211 661 | 6/2002 |
| EP | 1 650 730 | 4/2006 |
| JP | 2005-17715 | 1/2005 |
| JP | 2006-84729 | 3/2006 |
| WO | WO 93/19453 | 9/1993 |
| WO | WO 97/00452 | 1/1997 |
| WO | WO 2004/047058 | 6/2004 |

OTHER PUBLICATIONS

Japanese Office Action dated Nov. 18, 2008 for Japanese patent application No. 2008-072423 with English translation, 7 pages.

* cited by examiner

*Primary Examiner* — Alexander S Beck
*Assistant Examiner* — Charles Hicks
(74) *Attorney, Agent, or Firm* — Chernoff, Vilhauer, McClung & Stenzel

(57) ABSTRACT

A display that includes at least one gray level being provided to a plurality of pixels that illuminates each of the pixels with the gray level. The display applies corrective data for the pixels so as to reduce the mura effects of said display for those characteristics generally visible by the human visual system and so as not to reduce the mura effects of the display for those characteristics generally not visible by the human visual system.

10 Claims, 7 Drawing Sheets

Using a 2D CSF model to attenuate the Mura correction for maintaining a higher dynamic range after correction Modern LCD display and sources of Mura Capturing Mura tonescale via brute-force method Loading correction Mura tonescales in to display memory
(brute-force method)

Using the display for normal input imagery and the loaded Mura correction tonescale LUT. (brute-force method)

CSF dependence on viewing angle.
Measurements by Carlson[6] at a luminance of 108cd/m$^2$.

CSF of the human visual system

Using a 2D CSF model to attenuate the Mura correction for maintaining a higher dynamic range after correction Example signal effects of invention:
left = brute force method and loss of dynamic range,
right = CSF-filtered approach

REDUCTION OF MURA EFFECTS

CROSS-REFERENCE TO RELATED APPLICATIONS

Not applicable.

BACKGROUND OF THE INVENTION

The present invention relates to a system for detecting defects in a displayed image. More specifically, the present invention relates to a system for detecting and correcting mura defects in a displayed image.

The number of liquid crystal displays, electroluminescent displays, organic light emitting devices, plasma displays, and other types of displays are increasing. The increasing demand for such displays has resulted in significant investments to create high quality production facilities to manufacture high quality displays.

Despite the significant investment, the display industry still primarily relies on the use of human operators to perform the final test and inspection of displays. The operator performs visual inspections of each display for defects, and accepts or rejects the display based upon the operator's perceptions. Such inspection includes, for example, pixel-based defects and area-based defects. The quality of the resulting inspection is dependent on the individual operator is inspection which are subjective and prone to error.

"Mura" defects are contrast-type defects, where one or more pixels is brighter or darker than surrounding pixels, when they should have uniform luminance. For example, when an intended flat region of color is displayed, various imperfections in the display components may result in undesirable modulations of the luminance. Mura defects may also be referred to as "Alluk" defects or generally non-uniformity distortions. Generically, such contrast-type defects may be identified as "blobs", "bands", "streaks", etc. There are many stages in the manufacturing process that may result in Mura defects on the display.

Mura defects may appear as low frequency, high-frequency, noise-like, and/or very structured patterns on the display. In general, most Mura defects tend to be static in time once a display is constructed. However, some Mura defects that are time dependent include pixel defects as well as various types of non-uniform aging, yellowing, and burn in. Display non-uniformity deviations that are due to the input signal (such as image capture noise) are not considered Mura defects.

Referring to FIG. 1, mura defects may occur as a result of various components of the display. The combination of the light sources (e.g., fluorescent tubes or light emitting diodes) and the diffuser results in very low frequency modulations as opposed to a uniform field in the resulting displayed image. The LCD panel itself may be a source of mura defects because of non-uniformity in the liquid crystal material deposited on the glass. This type of mura tends to be low frequency with strong asymmetry, that is, it may appear streaky which has some higher frequency components in a single direction. Another source of mura defects tends to be the driving circuitry (e.g., clocking noise) which causes grid like distortions on the display. Yet another source of mura defects is pixel noise, which is primarily due to variations in the localized driving circuitry (e.g., the thin film transistors) and is usually manifested as a fixed pattern noise.

What is needed is improved Mura reduction techniques.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
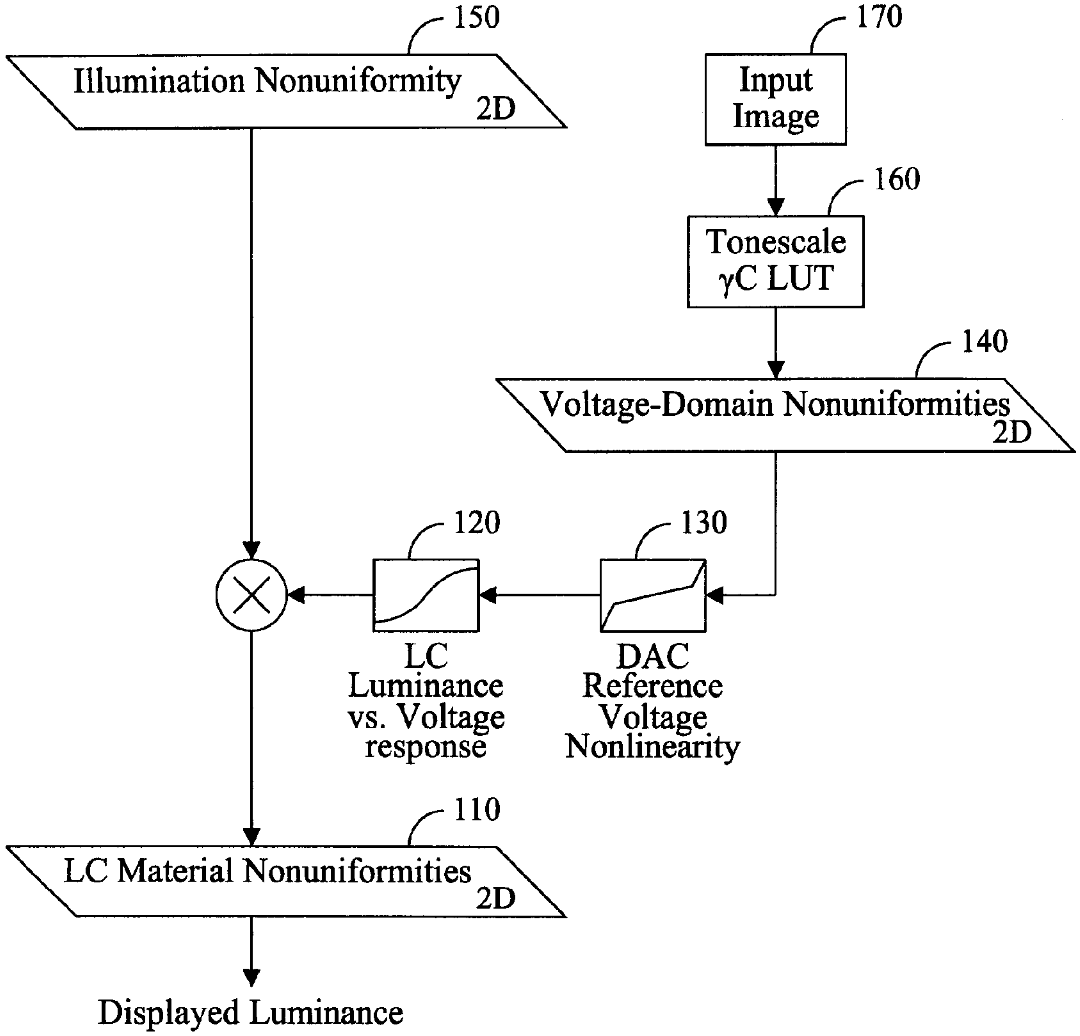
FIG. 1 illustrates liquid crystal devices and sources of mura.

The continual quality improvement in display components reduces mura defects but unfortunately mura defects still persist even on the best displays. Referring to FIG. 1, identification of mura defects is not straightforward because the source of the mura arise in different luminance domains. The mura resulting from the illumination source occurs in the linear luminance domain. To compensate for this effect from the linear domain, the LCD luminance image is divided by the mura and then re-normalized to the desired maximum level. This effect in the linear domain may also be compensated by addition in the log domain. Unfortunately, the data displayed on the image domain of the image in the LCD code value space is neither linear nor log luminance. Accordingly, the LCD image data should be converted to either of these domains for correction.

The mura defects due to the thin film transistor noise and driver circuits does not occur in the luminance domain, but rather occurs in the voltage domain. The result manifests itself in the LCD response curve which is usually an S-shaped function of luminance.

Variations in the mura effect due to variations in liquid crystal material occur in yet another domain, depending on if it is due to thickness of the liquid crystal material, or due to its active attenuation properties changing across the display.

Rather than correct for each non-uniformity in their different domains, a more straightforward approach is to measure the resulting tone scale for each pixel of the display. The low frequency mura non-uniformities as well as the higher frequency fixed pattern mura non-uniformity will appear as distortions in the displayed tone scale. For example, additive distortions in the code value domain will show up as vertical offsets in the tone scale's of the pixels affected by such a distortion. Illumination based distortions which are additive in the log domain will show up as non-linear additions in the tone scale. By measuring the tone scale per pixel, where the tone scale is a mapping from code value to luminance, the system may reflect the issues occurring in the different domains back to the code value domain. If each pixel's tonescale is forced to be identical (or substantially so), then at each gray level all of the pixels will have the same luminance (or substantially so), thus the mura will be reduced to zero (or substantially so).

Figure 2:
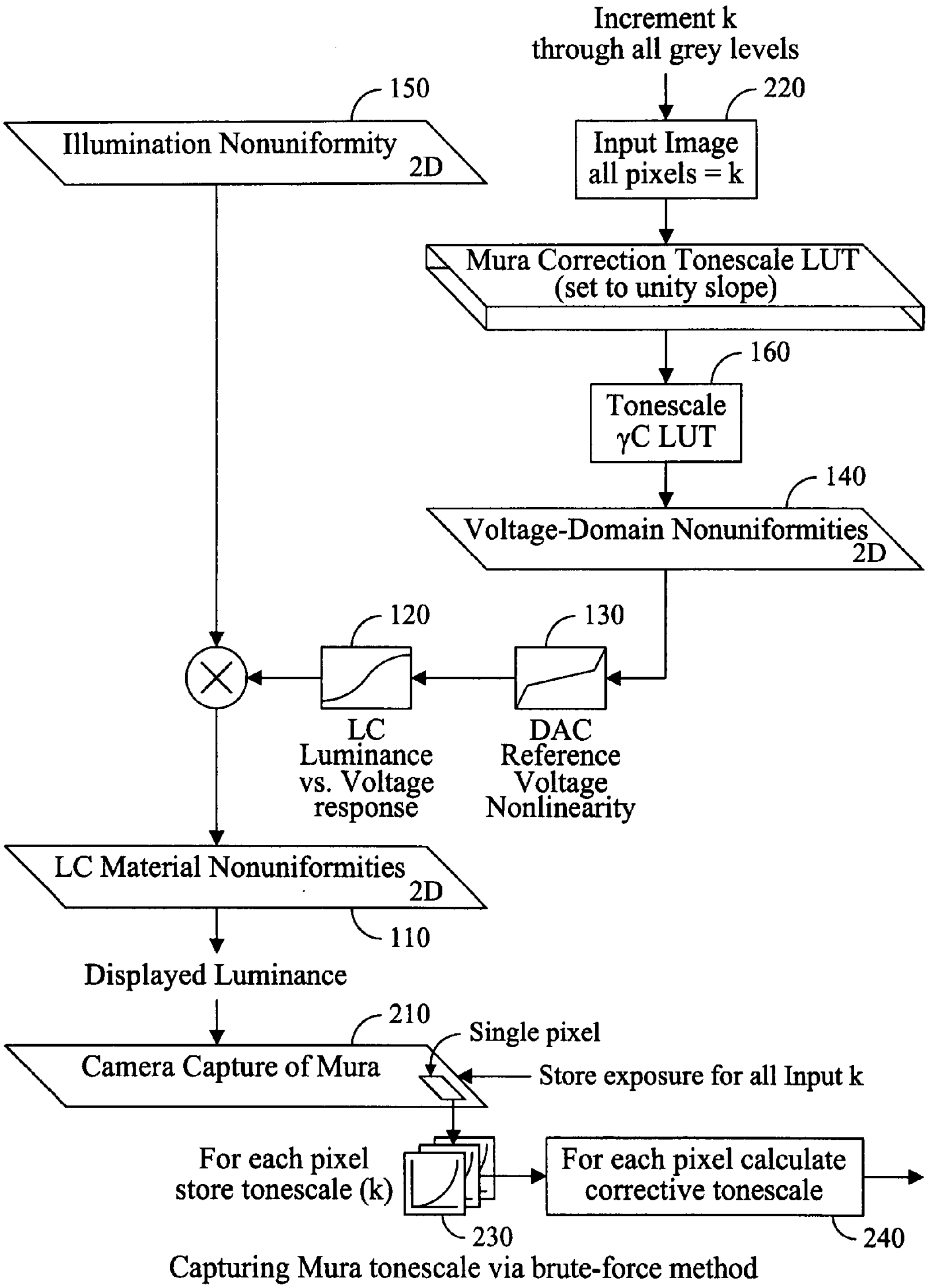
FIG. 2 illustrates capturing mura tonescale.
Figure 3:
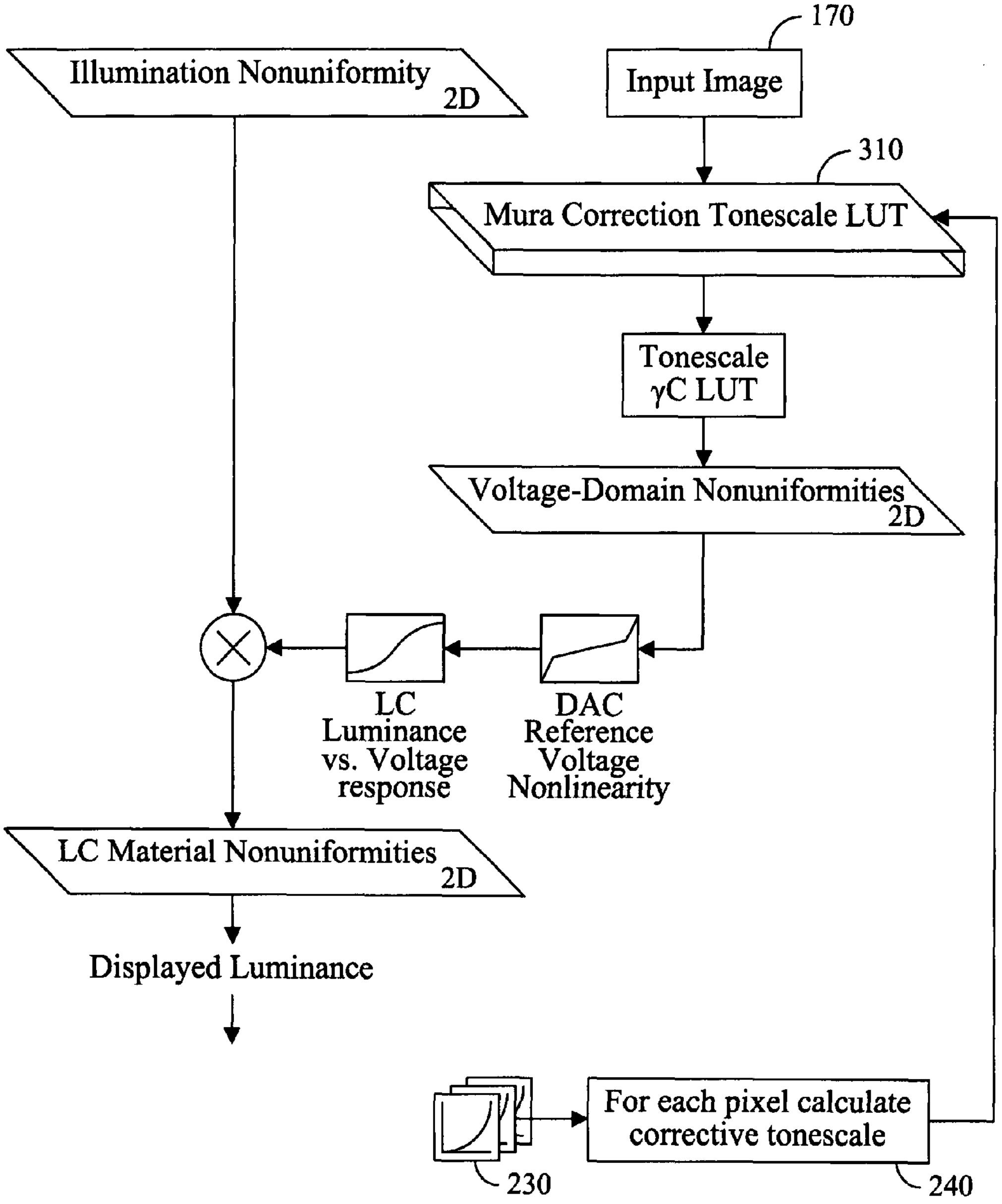
FIG. 3 illustrates loading correction mura tonescales.

Referring to FIG. 2, the process of detecting and correcting for mura defects may be done as a set of steps. First, the capture and generation of the corrective tone scale is created which may be expressed in the form of a look up table. Second, referring to FIG. 3 the corrective tone scale may be applied to a mura look up table which operates on the frame buffer memory of the display. Third, referring to FIG. 4, the display is used to receive image data which is modified by the mura look up table, prior to being displayed on the display.

The first step is to use an image capture device, such as a camera, to capture the mura as a function of gray level. The camera should have a resolution equal to or greater than the display so that there is at least one pixel in the camera image corresponding to each display pixel. For high resolution displays or low resolution cameras, the camera may be shifted in steps across the display to characterize the entire display. The preferable test patterns provided to and displayed on the display include uniform fields (all code values=k) and captured by the camera. The test pattern and capture are done for all of the code values of the displays tone scale (e.g., 256 code values for 8 bit/color display). Alternatively, a subset of the tone scales may be used, in which case typically the non-sampled tone values are interpolated.

Figure 4:
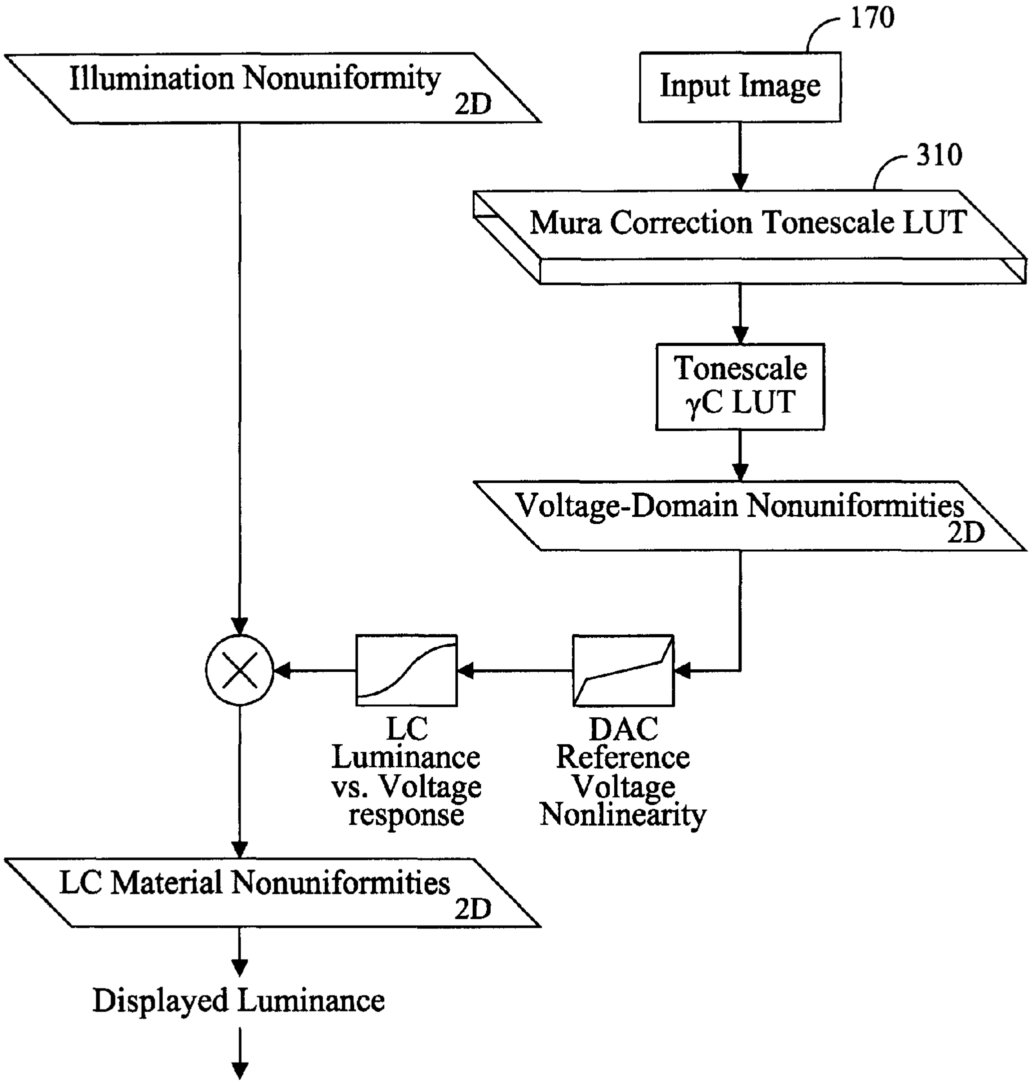
FIG. 4 illustrates input imagery and loaded mura correction tonescale.

The captured images are combined so that a tone scale across its display range is generated for each pixel (or a sub-set thereof). If the display has zero mura, then the corrective mura tone scales would all be the same. A corrective tone scale for each pixel is determined so that the combination of the corrective tone scale together with the system non-uniformity provides a resulting tone scale that is substantially uniform across the display. Initially, the values in the mura correction tone scale look up table may be set to unity before the display is measured. After determining the corrective mura tone scale values for each pixel, it is loaded into the display memory as shown in FIG. 4.

Figure 5:
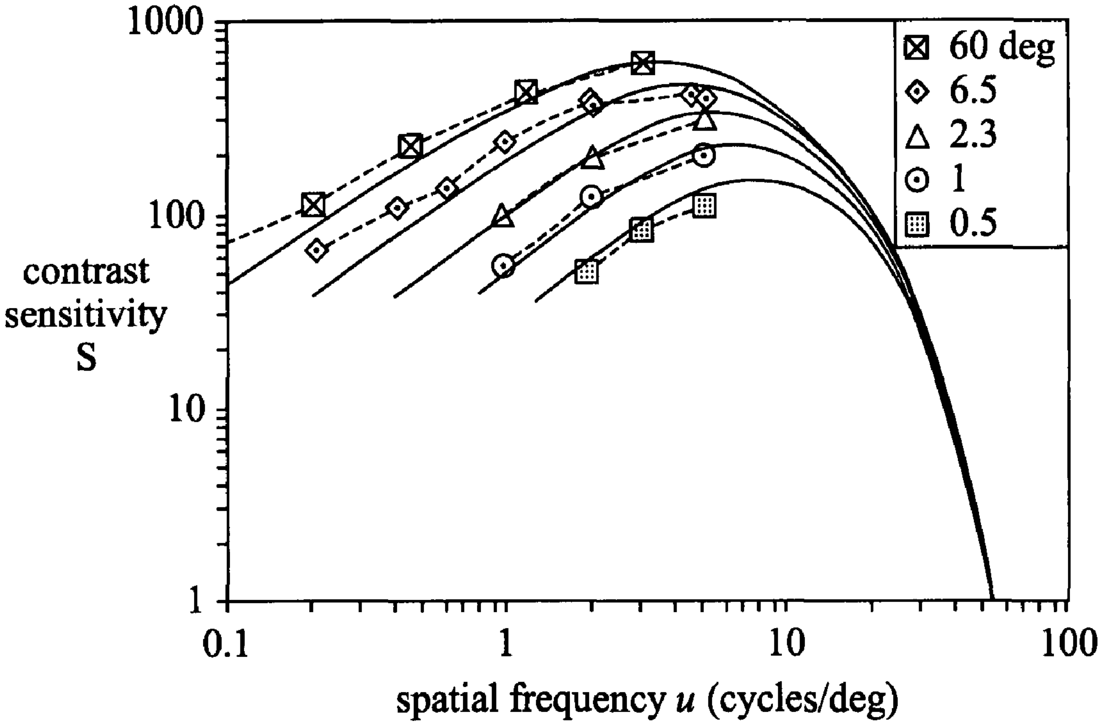
FIG. 5 illustrates contrast sensitivity function dependence on viewing angle.

Referring to FIG. 5, with the mura corrective tone scale data loaded any flat field will appear uniform, and even mura that may be visible on ramped backgrounds, such as a sky gradient, will be set to zero.

While this mura reduction technique is effective for reducing display non-uniformities, it also tends to reduce the dynamic range, namely, the maximum to minimum in luminance levels. Moreover, the reduction in the dynamic range also depends on the level of mura which varies from display to display, thus making the resulting dynamic range of the display variable. For example, the mura on the left side of the display may be less bright than the mura on the right side of the display. This is typical for mura due to illumination non-uniformity, and this will tend to be the case for all gray levels. Since the mura correction can not make a pixel brighter than its max, the effect of mura correction is to lower the luminance of the left side to match the maximum value of the darker side. In addition, for the black level, the darker right side can at best match the black level of the lighter left side. As a result, the corrected maximum gets reduced to the lowest maximum value across the display, and the corrected minimum gets elevated to the lightest minimum value across the display. Thus, the dynamic range (e.g., log max−log min) of the corrected display will be less than either the range of the left or right sides, and consequently it is lower than the uncorrected display. The same reduction in dynamic range also occurs for the other non-uniformities. As an example, a high amplitude fixed pattern noise leads to a reduction of overall dynamic range after mura correction.

The technique of capturing the mura from the pixels and thereafter correcting the mura using a look up table may be relatively accurate within the signal to noise ratio of the image capture apparatus and the bit-depth of the mural correction look up table. However, it was determined that taking into account that actual effects of the human visual system that will actually view the display may result in a greater dynamic range than would otherwise result.

By way of example, some mura effects of particular frequencies are corrected in such a manner that the changes may not be visible to the viewer. Thus the dynamic range of the display is reduced while the viewer will not otherwise perceive a difference in the displayed image. By way of example, a slight gradient across the image so that the left side is darker than the right side may be considered a mura effect. The human visual system has very low sensitivity to such a low frequency mura artifact and thus may not be sufficiently advantageous to remove. That is, it generally takes a high amplitude of such mura waveforms to be readily perceived by the viewer. If the mura distortion is generally imperceptible to the viewer, although physically measurable, then it is not useful to modify it.

Referring to FIG. 5, one measure of the human visual system is a contrast sensitivity function (CSF) of the human eye. This is one of several criteria that may be used so that only the mura that is readily visible to the eye is corrected. This has the benefit of maintaining a higher dynamic range of the correction than the technique illustrated in FIGS. 3-5.

The CSF of the human visual system is a function of spatial frequencies and thus should be mapped to digital frequencies for use in mura reduction. Such a mapping is dependent on the viewing distance. The CSF changes shape, maximum sensitivity, and bandwidth is a function of the viewing conditions, such as light adaptation level, display size, etc. As a result the CSF should be chosen for the conditions that match that of the display and its anticipated viewing conditions.

The CSF may be converted to a point spread function (psf) and then used to filter the captured mura images via convolution. Typically, there is a different point spread function for each gray level. The filtering may be done by leaving the CSF in the frequency domain and converting the mura images to the frequency domain for multiplication with the CSF, and then convert back to the spatial domain via inverse Fourier transform.

Figure 6:
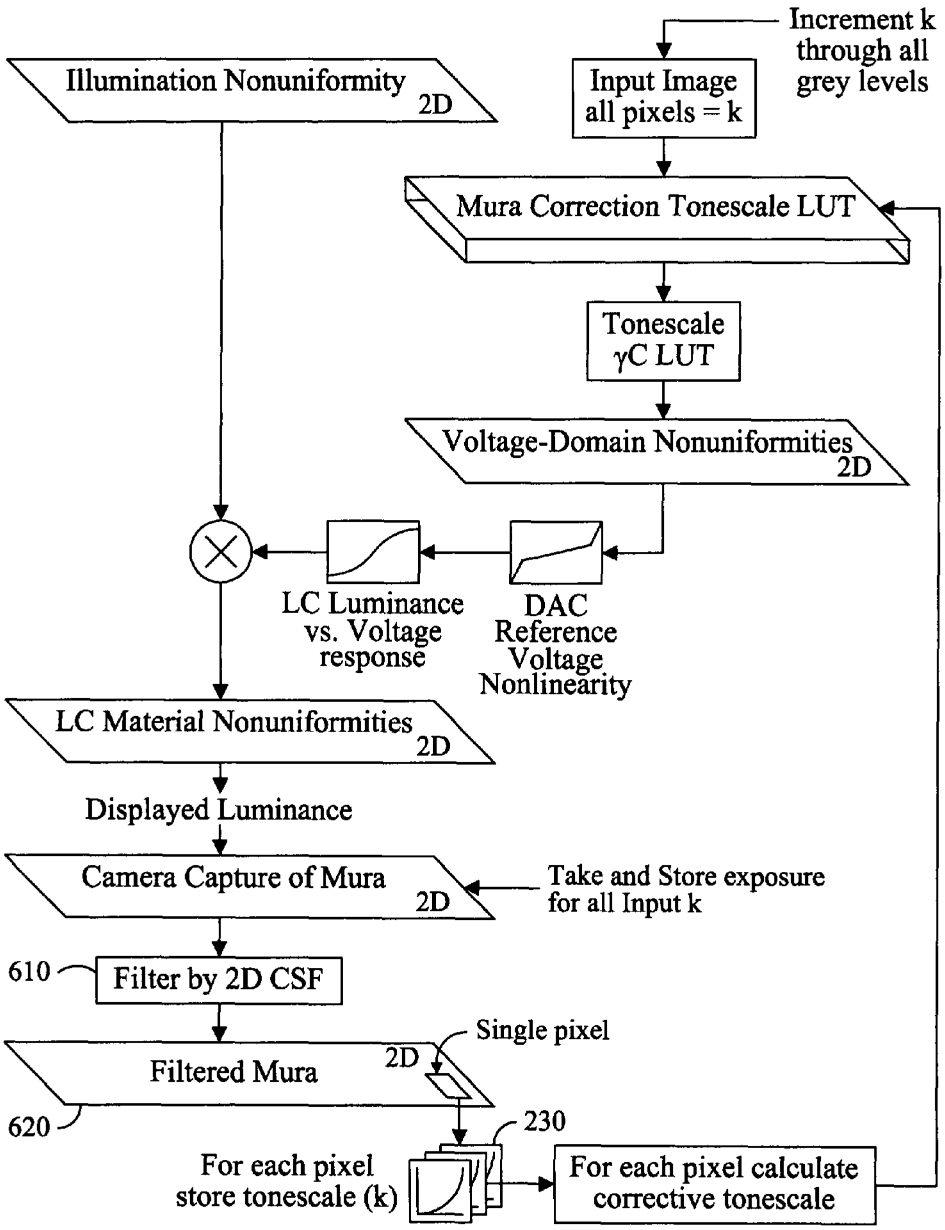
FIG. 6 illustrates a contrast sensitivity model to attenuate the mura correction to maintain a higher dynamic range.
Figure 7:
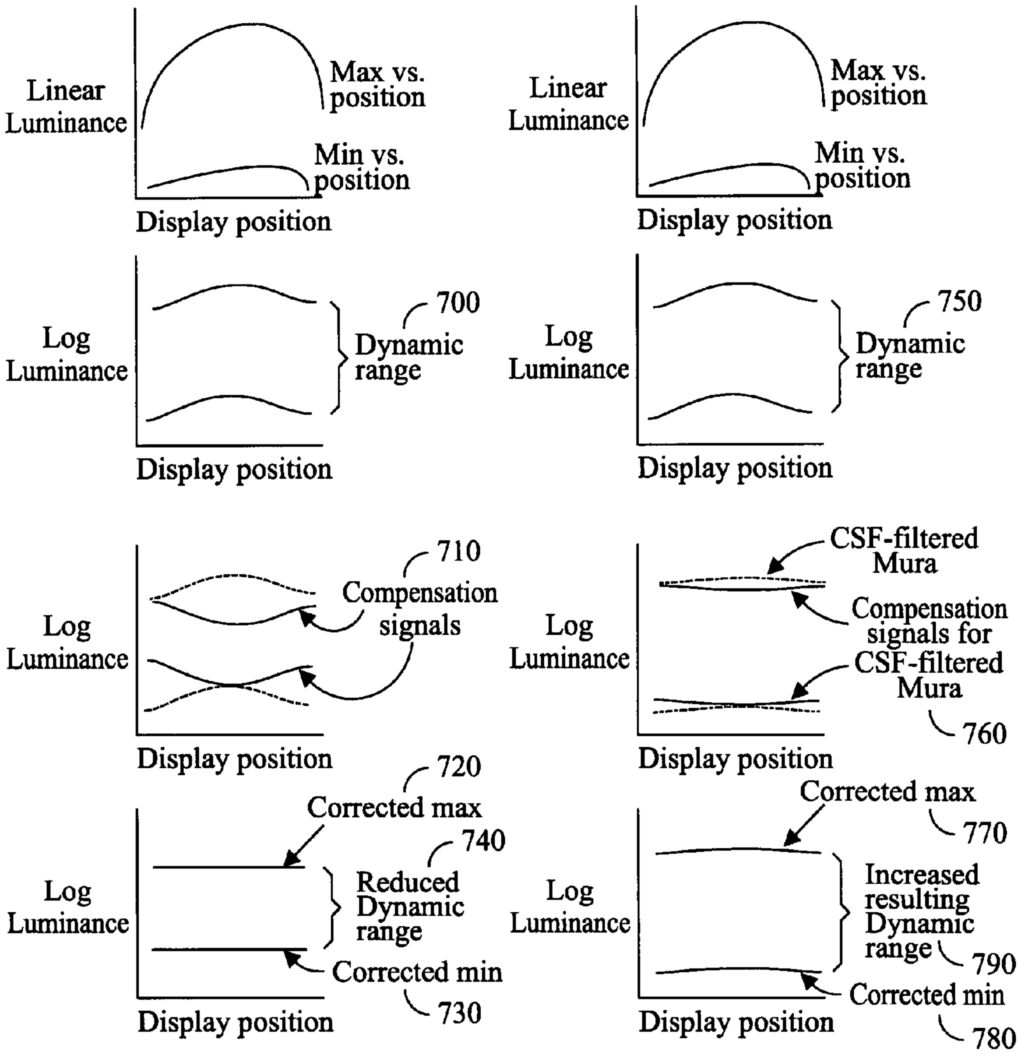
FIG. 7 illustrates examples of mura correction with and without using the contrast sensitivity model.

Referring to FIG. 6, a system that includes mura capture, corrective mura tone scale calculation, CSF filtered, and mura correction tone scale look up table is illustrated. FIG. 7 illustrates the effects of using the CSF to maintain bandwidth.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for reducing mura defects in a display having a tone scale driven by respective input luminance code values to said display, said method comprising:

(a) sequentially illuminating a plurality of pixels at each of a plurality of gray levels, each one of said plurality of gray levels corresponding to a respective input luminance code value to said display, and wherein said plurality of gray levels include less than all of the tone scale of said display, and wherein fewer gray levels at the lower range of said tone scale of said display are used in said step of sequentially illuminating than are used at the higher range of said tone scale;

(b) capturing said display with an image sensing device external to said display at each one of the illuminated said gray levels;

(c) determining corrective data for said pixels so as to reduce the mura effects of said display;

(d) storing said corrective data in said display to process an image received by said display so as to reduce said mura effects.

2. The method of claim 1 wherein said plurality of pixels include substantially all of the pixels of said display.

3. The method of claim 1 wherein said plurality of gray levels include substantially all of the gray levels of said display.

4. The method of claim 1 wherein said capturing is with a camera having a resolution greater than that of the display.

5. The method of claim 4 wherein there is at least one sensing element for each of said pixels of said display.

6. The method of claim 1 wherein corrective is provided for each pixel of said display.

7. A method for reducing mura defects in a display, said method comprising:

(a) providing a plurality of gray levels to a plurality of pixels of said display;

(b) illuminating each of said pixels with a plurality of said gray levels;

(c) capturing said plurality of grey levels of each of said pixels of each of said plurality of pixels with an image sensing device external to said display;

(d) determining corrective data for said pixels so as to correct the mura defects of said display for those characteristics having a magnitude generally visible by the human visual system and so as not to correct the mura defects of the display for those characteristics having a magnitude generally not visible by the human visual system, based upon a weighting function that emphasizes a mid-range tone over a low range tone and a high range tone that results in a greater dynamic range of said image;

(e) storing said corrective data in said display to process an image received by said display so as to reduce said mura effects.

8. The method of claim 7 wherein as a result of using said corrective data the dynamic range of said image displayed on said display is greater than it would have otherwise been had the characteristics generally not visible by the human visual system been considered.

9. A display comprising:

(a) at least one gray level being provided to a plurality of pixels of said display;

(b) said display illuminating each of said pixels with said at least one gray level;

(c) said display applying corrective data for said pixels so as to correct the mura defects of said display for those characteristics generally visible by the human visual system and so as not to correct the mura defects of the display for those characteristics generally not visible by the human visual system, wherein said corrective data is based upon a weighting function that emphasizes a mid-range over a low range and a high range.

10. The display of claim 9 wherein the dynamic range of said image displayed on said display is greater than it would have otherwise been had the characteristics generally not visible by the human visual system been considered.

* * * * *